(12) United States Patent
Zhu

(10) Patent No.: US 10,464,544 B2
(45) Date of Patent: Nov. 5, 2019

(54) SUSPENSION TRAIN AND OPERATING SYSTEM THEREOF

(71) Applicant: Xiaoyi Zhu, Shenzhen (CN)

(72) Inventor: Xiaoyi Zhu, Shenzhen (CN)

( * ) Notice: Subject to any disclaimer, the term of this patent is extended or adjusted under 35 U.S.C. 154(b) by 494 days.

(21) Appl. No.: 15/254,613

(22) Filed: Sep. 1, 2016

(65) Prior Publication Data

US 2017/0129472 A1    May 11, 2017

Related U.S. Application Data

(63) Continuation-in-part of application No. PCT/CN2015/097006, filed on Dec. 10, 2015.

(30) Foreign Application Priority Data

Nov. 6, 2015 (CN) .......................... 2015 1 0769710
Nov. 6, 2015 (CN) .......................... 2015 1 0769768
Nov. 6, 2015 (CN) .......................... 2015 1 0769838

(51) Int. Cl.
*B60V 3/04* (2006.01)
*B61B 13/08* (2006.01)

(52) U.S. Cl.
CPC .............. *B60V 3/04* (2013.01); *B61B 13/08* (2013.01); *Y02T 30/30* (2013.01); *Y02T 30/40* (2013.01)

(58) Field of Classification Search
CPC ........... B60V 3/04; B61B 13/08; B61B 13/10; B61B 13/12; B61B 13/122; B61B 13/125; Y02T 30/30; Y02T 30/40
See application file for complete search history.

(56) References Cited

U.S. PATENT DOCUMENTS

| | | | | |
|---|---|---|---|---|
| 3,235,099 A | * | 2/1966 | Watters | B60P 1/60 414/676 |
| 4,343,506 A | * | 8/1982 | Saltzman | B62D 35/001 105/1.2 |
| 4,789,117 A | * | 12/1988 | Paterson | B62D 35/00 138/37 |
| 5,114,099 A | * | 5/1992 | Gao | B64C 21/10 244/130 |
| 6,129,025 A | * | 10/2000 | Minakami | B60L 5/005 104/88.01 |
| 6,178,892 B1 | * | 1/2001 | Harding | B60V 3/04 104/119 |
| 6,685,256 B1 | * | 2/2004 | Shermer | B60J 5/108 296/180.1 |
| 8,315,847 B1 | * | 11/2012 | Schmidt | B64C 21/10 244/130 |

(Continued)

*Primary Examiner* — Jason C Smith
(74) *Attorney, Agent, or Firm* — Stein IP, LLC

(57) ABSTRACT

Provided are embodiments of a suspension train comprising a shell body, wheels and a flow disturbing plate connected with the wheels, a suspension train operating system comprising a non-vacuum cover body and the suspension train traveling in the cover body in an ideal vacuum state at high speeds, and first and second propelling force sources converted from fluid resistance for multiplying propelling force of the train. A fluid channel communicating with the outside is formed between the upper surface of the flow disturbing plate with the lower surface being a concave-convex flow disturbing surface and the bottom of the shell body. The high-speed suspension train is completely driven by solar energy.

22 Claims, 5 Drawing Sheets

(56) References Cited

U.S. PATENT DOCUMENTS

| | | | | |
|---|---|---|---|---|
| 8,684,446 B2* | 4/2014 | Zhu | ................ | B61D 17/02 |
| | | | | 296/180.1 |
| 9,278,719 B2* | 3/2016 | Zhu | ................ | B62D 35/02 |
| 2002/0000497 A1* | 1/2002 | Drews | ................ | B32B 38/00 |
| | | | | 244/200 |
| 2012/0265393 A1* | 10/2012 | Goelet | ................ | B60V 1/046 |
| | | | | 701/29.1 |
| 2017/0129472 A1* | 5/2017 | Zhu | ................ | B60V 3/04 |
| 2017/0129551 A1* | 5/2017 | Zhu | ................ | B60K 7/0023 |

* cited by examiner

US 10,464,544 B2

SUSPENSION TRAIN AND OPERATING SYSTEM THEREOF

CROSS-REFERENCE TO RELATED APPLICATIONS

This application is a continuation-in-part of International Application No. PCT/CN2015/097006, filed Dec. 10, 2015, which claims the benefit of priority to Chinese Application Nos. 201510769710.5, 201510769768.X, and 201510769838.1 all filed on Nov. 6, 2015, in the State Intellectual Property Office. All disclosures of the documents named above are incorporated in their entireties herein by reference.

TECHNICAL FIELD

The invention relates to the technical field of high-speed trains, in particular to a suspension train and an operating system thereof.

DESCRIPTION OF RELATED ART

In the two hundred years since the appearance of trains, high-speed trains and magnetic suspension trains have been developed in recent decades, and the basic structure and principle of the trains have not substantially changed; although compared with the high-speed trains, the speed of existing magnetic suspension trains has already been greatly increased, the cost of the magnetic suspension trains is extremely high, the environment pollution caused by electromagnetic fields when the magnetic suspension trains travel is extremely severe, the power consumption is extremely large, and thus continuous development of the magnetic suspension trains is extremely difficult.

Currently, magnetic suspension trains, vacuum pipeline traffic, flying trains, searching for the probability of solar driving and the like are the main future development direction of the high-speed trains in the world.

For example, electromagnetic fields generated by huge electric power are used for suspending the magnetic suspension trains, actually, lift force is inevitably generated when the high-speed trains are in the natural high-speed traveling state, the trains can be suspended by reasonably using the lift force which is inevitably generated in the natural state, and the suspension effect of the magnetic suspension trains can also be achieved by means of the lift force generated when the high-speed trains travel at the high speed; the cost of the ordinary high-speed trains is multiple times lower than the cost of the magnetic suspension trains.

In another example, it is extremely difficult to form a vacuum state in a pipeline, which may be at least hundreds of kilometers long or even over one thousand kilometers long, of vacuum pipeline traffic; even if the vacuum state can be formed, a huge amount of power needs to be consumed, and thus implementation is quite difficult; actually, the trains can travel in non-vacuum pipelines in an ideal vacuum state at a high speed.

In another example, according to those commonly skilled in the field, when the trains travel, wheels inevitably bear all the weight of the trains, power is consumed according to the weight, and consequentially large power consumption is caused.

For another example, according to those commonly skilled in the field, a weight increasing way is generally adopted by the existing high-speed trains to overcome lift force, however, energy consumption is increased due to the increment of the self weight of the high-speed trains.

The most serious and biggest problem not solved in two hundred years since the development of the trains, is that 90% of energy is consumed for overcoming the fluid resistance when the trains travel at a high speed, the actual energy utilization rate of the trains is only about 10%, and the development of the high-speed trains is seriously affected by the such low energy utilization rate.

The structures including flying trains, energy-saving trains, pipeline traffic, solar-driven trains and the like are provided in the authorized invention patent, which is entitled 'automobile or train operating system and cover body thereof' and of which the application number is 20101094990.6, of the inventor.

Through many years of study, the inventor further originally realized that a first propelling force source and a second propelling force source which are obtained from fluid resistance and provides a suspension train which can generate lift force in the natural state; on this basis, the effect that the train travels a non-vacuum pipeline in an ideal vacuum state at a high speed is achieved through further development; high-speed trains which are completely driven by solar energy and high-speed suspension trains which are completely driven by solar energy are created.

BRIEF SUMMARY OF THE INVENTION

The invention aims to realize the technical purposes that a suspension train which can remarkably reduce power consumption is provided, lift force is generated by the suspension train in the natural state, a shell body is integrally suspended in the traveling process, and lift force is eliminated by wheels; in addition, the invention provides a high-speed suspension train operating system used in ordinary pipelines.

According to the technical scheme adopted by the invention for achieving the technical purposes:

The suspension train is provided, and the suspension train comprises a shell body and wheels and further comprises a flow disturbing plate; the flow disturbing plate is connected with the wheels or the lower surface of the flow disturbing plate is connected with a supporting plate and the wheels through connecting devices, and a fluid channel which communicates with the outside is formed between the upper surface of the flow disturbing plate and the bottom of the shell body; the lower surface of the flow disturbing plate is a flow disturbing surface which is concave and convex relative to the surface.

Based on the same idea, another suspension train is provided. The suspension train comprises a shell body and a connecting plate, and the supporting plate is formed by connecting an upper plate body and a lower plate body through two or more supporting frames.

The shell body is arranged between the upper plate body and the lower plate body, and fluid channels with the front portions and the rear portions communicating with the outside are formed in the upper portion and the lower portion of the train correspondingly; a flow disturbing surface which is concave and convex relative to the surface is arranged on the outer surface of the lower plate body, so that lift force is generated by the shell body and eliminated by the connecting plate.

Based on the same idea, a suspension train operating system is further provided, the suspension train operating system comprises a non-vacuum cover body and the suspension train, and the suspension train travels in the non-vacuum cover body.

Based on the same idea, another suspension train operating system is further provided, the suspension train operating system comprises a non-vacuum cover body and the suspension train, and the outer surface of the non-vacuum cover body is covered with a solar device; the solar device drives the suspension train to travel in the cover body.

Compared with the prior art where in the traveling process of a train, a large amount of energy is consumed due to the fact that wheels of the train have to bear all the weight of the train, the weight of a train chassis further needs to be increased to overcome upward lift force, and consequentially the defect that the energy consumption is increased is caused, the invention has the beneficial effects that:

The fluid channel which communicates with the outside is formed between the flow disturbing plate connected with the wheels and the lower portion of the shell body of the train of the invention, and the flow speed of the fluid passing through the fluid channel is made lower than the flow speed of fluid passing through the upper portion of the shell body of the train, so that an extremely-large upward pressure difference is formed between the upper portion and the lower portion of the shell body of the train, and accordingly the shell body of the train generates upward lift force to be suspended; due to the fact that the lower surface of the flow disturbing plate is the flow disturbing surface which is concave and convex relative to the surface, a fluid passing path is lengthened, a downward pressure difference is generated due to the different flow speeds of the upper surface and the lower surface of the flow disturbing plate, and thus the lift force is eliminated by the wheels; the flow disturbing plate is connected with the wheels, the shell body of the train generates the lift force to be suspended, and on the contrary the wheels eliminate the lift force; according to the present invention, a train body generates the lift force, the wheels eliminate the lift force, and the technical structures seem to be mutually contradictory are reasonably combined in the invention.

Description of the marks: shell body—1; connecting plate—102; wing—103; supporting frame—104; air port—105;

upper portion of the shell body—2; shell body upper surface—21; shell body lower surface—22; upper plate body—23;

lower plate body—24; lower portion of the shell body—3; fluid channel—4;

channel inlet—41; channel outlet—42; first fluid channel—43; second fluid channel—44;

flow disturbing surface—5; flow disturbing plate—51; supporting plate—6; wheel—7; connecting shaft—8; magnetic device—9;

connecting device—11; outer fluid channel—12; inner fluid channel—13; first air port—14; second air port—15; communication pipe—16; engine—17; exhaust port—18;

cover body—20; solar device—201; suspension train—202.

DETAILED DESCRIPTION OF THE INVENTION

A detailed description of the technical content, structural characteristics and realized purposes and effects of the invention is given with embodiments and accompanying drawings as follows.

The key idea of the invention lies in that, by means of the different flow speeds of fluid passing through different positions of the upper portion and the lower portion of a shell body of a train, the shell body 1 of the train can be suspended due to the pressure difference and lift force generated between the upper portion and the lower portion of the shell body 1 of the train in the natural state; the pressure difference generated due to the different flow speeds of the upper surface and the lower surface of a flow disturbing plate at the bottom of the train is used for eliminating the lift force, and the technical structures which seem to be mutually contradictory are reasonably combined in the invention.

Figure 1:
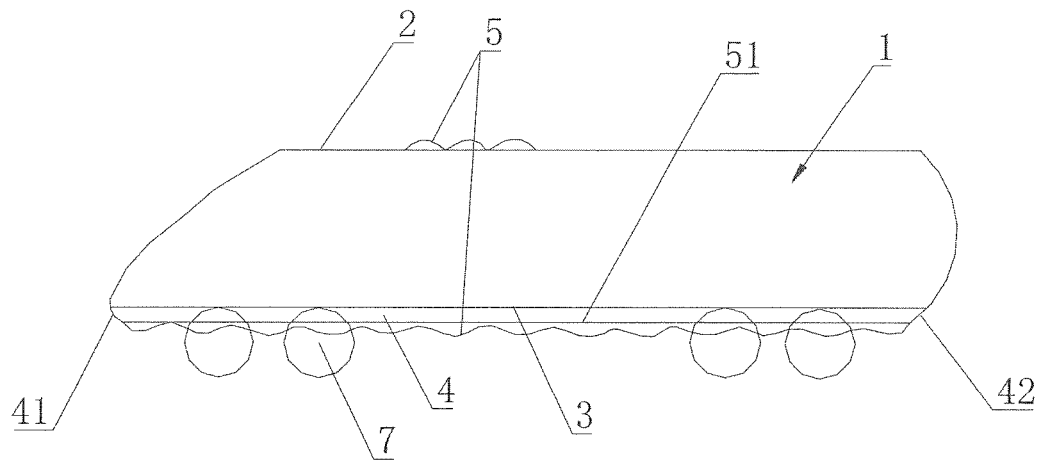
FIG. 1 is a structural schematic diagram of a suspension train of one embodiment of the invention.
Figure 2:
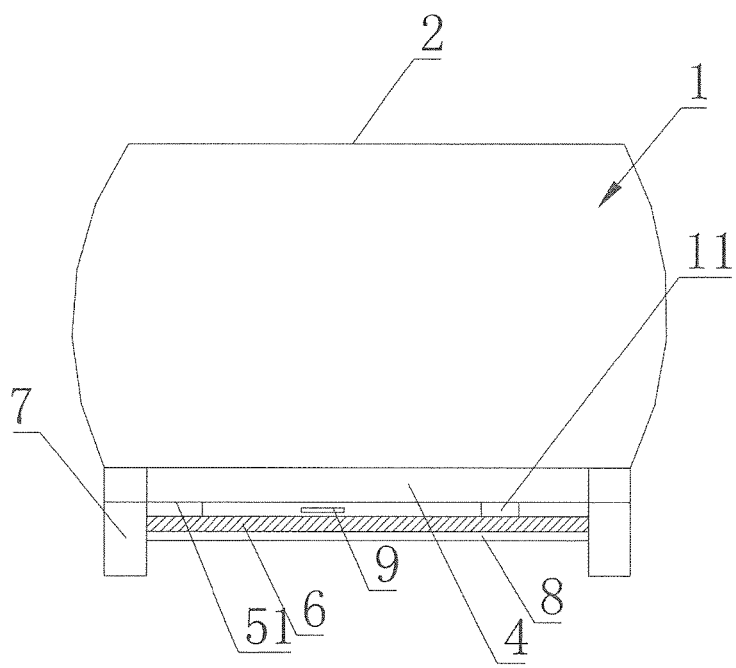
FIG. 2 is a rear-view structural schematic diagram of the suspension train of the embodiment of the invention.
Figure 3:
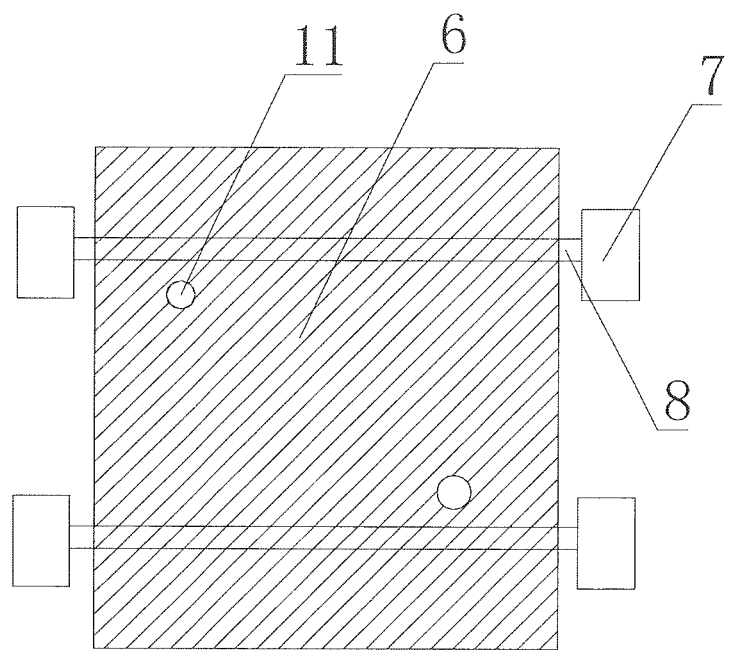
FIG. 3 is a structural schematic diagram of a supporting plate in the suspension train of the embodiment of the invention.

Please see FIG. 1 to FIG. 3; the invention provides a first suspension train, the suspension train comprises a shell body 1, wheels 7 and a flow disturbing plate 51; the flow disturbing plate 51 is connected with the wheels 7 or the flow disturbing plate is connected with a supporting plate and the wheels through connecting devices, a certain distance exists between the upper surface of the flow disturbing plate 51 and the bottom of the shell body 1, so that a fluid channel 4 with the front portion and the rear portion communicating with the outside is formed; the lower surface of the flow disturbing plate 51 is a flow disturbing surface 5 which is concave and convex relative to the surface.

Based on the above description, the invention has the beneficial effects that due to the fact that the flow speeds of the bottom and the top of the shell body 1 are different, the shell body 1 serving as a load space generates the pressure difference and lift force to be suspended; pressure differences are generated between the upper surface and the lower surface of the flow disturbing plate 51 located at the bottom of the train and connected with the wheels 7 due to the different flow speeds, so that the lift force is eliminated; the shell body 1 serving as the load space is flexibly connected with the flow disturbing plate 51 through connecting devices 11 so that the shell body 1 can generate lift force without driving the wheels to generate lift force, and on the contrary, the lift force is eliminated by the wheels 7.

Furthermore, the shell body 1 comprises an upper portion of the shell body 2 and a lower portion of the shell body 3, and the outer surface of the upper portion of the shell body 2 is provided with a flow disturbing surface 5 used for lengthening a fluid passing path; a certain distance exists between the upper surface of the flow disturbing plate 51 and the lower portion of the shell body 3, so that the fluid channel 4 is formed, the path of the fluid passing through the fluid channel 4 is made shorter than the path of the fluid passing through the upper portion of the shell body 2, and lift force is generated by the shell body 1; in addition, the path of the fluid passing through the lower side of the flow disturbing surface 5 is made longer than the path of the fluid passing through the upper side of the flow disturbing surface 5, namely the path of the fluid passing through the lower side of the flow disturbing surface 5 is made longer than the path of the fluid passing through the fluid channel 4, so that the lift force is eliminated by the wheels.

Furthermore, the suspension train comprises the connecting devices, and the flow disturbing plate 51 is connected with the wheels 7 through the connecting devices 11.

Furthermore, the suspension train comprises a supporting plate 6, the connecting devices 11 are arranged between the supporting plate 6 and the flow disturbing plate 51 to make the supporting plate 6 and the flow disturbing plate 51 connected, and the supporting plate 6 is fixedly arranged below the flow disturbing plate 51 and connected with the wheels 7.

Furthermore, the suspension train comprises magnetic devices 9, the magnetic poles of the magnetic devices 9 in two opposite directions are opposite, and the magnetic devices 9 are arranged between the supporting plate 6 and the flow disturbing plate 51.

Furthermore, the flow disturbing surface 5 is composed of arcs or triangles and/or trapezoids used for lengthening the fluid passing path; or the flow disturbing surface is composed of a plurality of spiral flow disturbing strips, or the flow disturbing surface is composed of water ripples which are symmetrical in the longitudinal direction or symmetrical in the transverse direction and the longitudinal direction.

Figure 4:
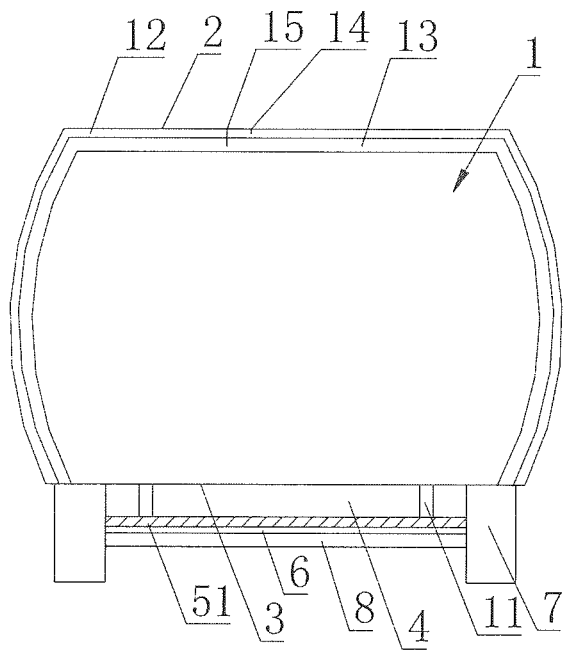
FIG. 4 is a rear view of a suspension train of another embodiment of the invention.
Figure 5:
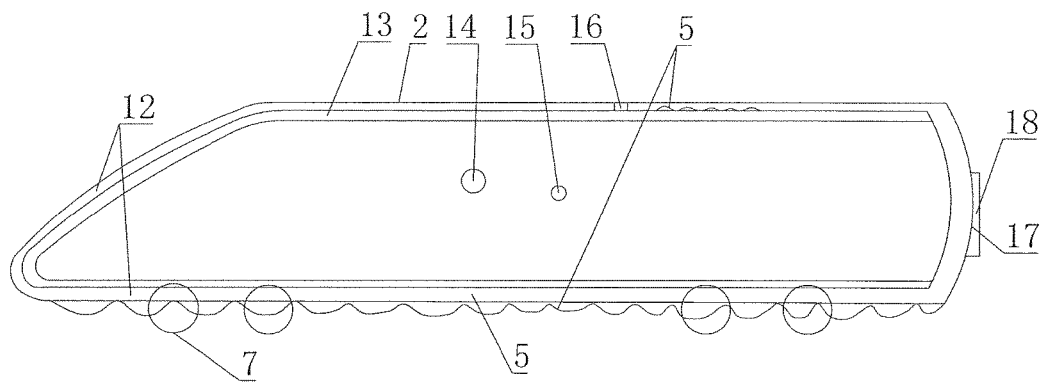
FIG. 5 is a structural schematic diagram of a suspension train of another embodiment of the invention.

Please see FIG. 4 to FIG. 5, an inner fluid channel 13 and an outer fluid channel 12 which communicate with the outside are sequentially formed in the shell body 1 of the train of the embodiment in a surrounding mode from inside to outside, and a flow disturbing surface 5 which is concave and convex relative to the surface is arranged in the outer fluid channel 12.

Furthermore, the suspension train comprises first air ports 14 and second air ports 15 formed in the shell body 1; the outer fluid channel 12 communicates with the outside through two or more first air ports 14; the inner fluid channel 13 communicates with the outside through two or more second air ports 15; the venting areas of the first air ports 14 are larger than the venting areas of the second air ports 15.

Furthermore, the inner fluid channel 13 communicates with the outer fluid channel 12 through two or more second air ports 15.

Furthermore, the suspension train comprises an engine 17, and an air suction port of the engine 17 communicates with the first air ports 14 through the outer fluid channel 12.

Figure 6:
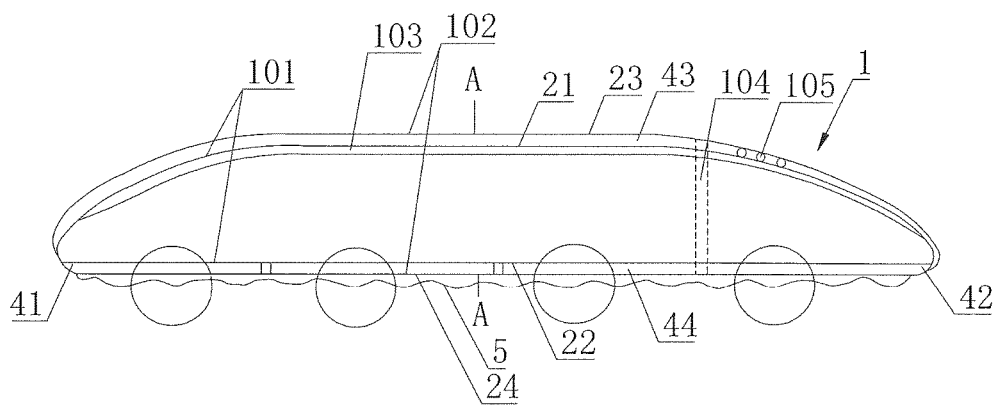
FIG. 6 is a structural schematic diagram of a suspension train of another embodiment of the invention.
Figure 7:
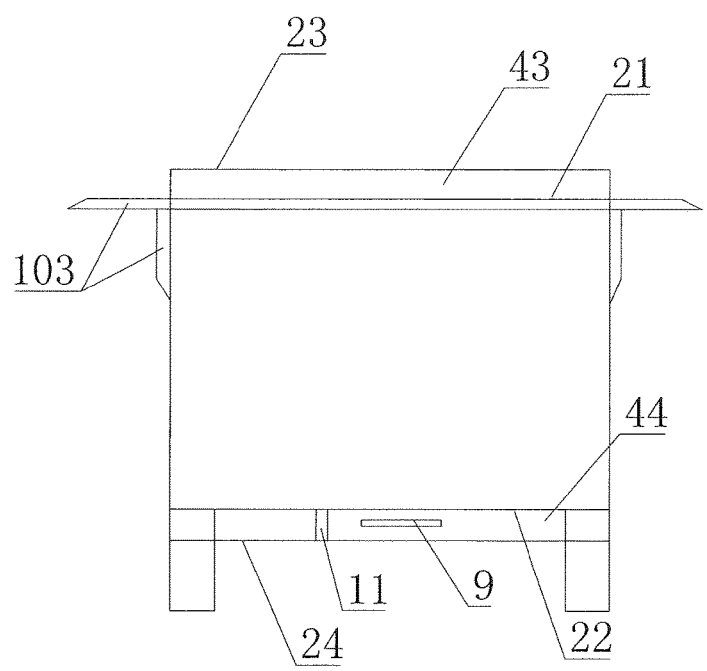
FIG. 7 is a section view along A-A of FIG. 5.
Figure 8:
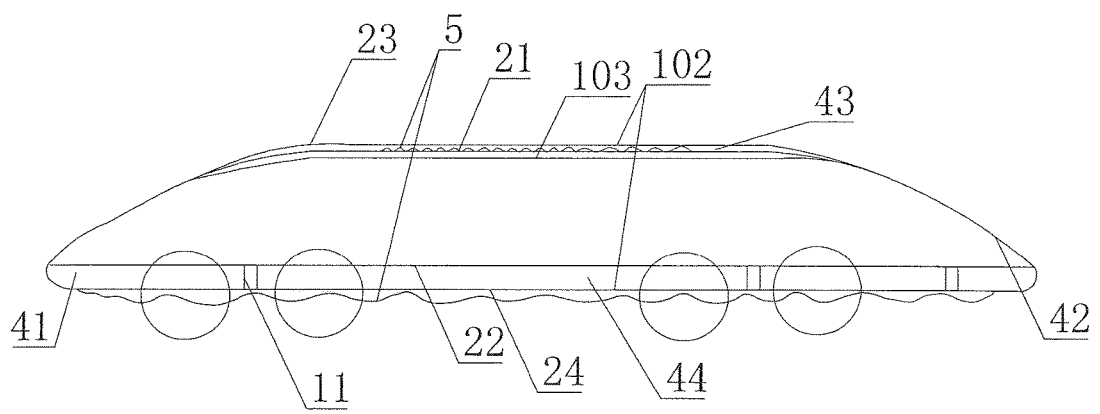
FIG. 8 is a structural schematic diagram of a suspension train of another embodiment of the invention.

Please see FIG. 6 to FIG. 8, the invention further provides a second suspension train based on the same idea, the suspension train comprises a shell body and a connecting plate, the shell body 1 serves as a load space, the connecting plate 102 is formed by connecting two or more supporting frames 104 between the upper plate body 23 and the lower plate body 24, fluid channels with the front portions and the rear portions communicating with the outside are formed between the shell body 1 and the connecting plate 102 and located in the upper portion and the lower portion of the train correspondingly, and a flow disturbing surface 5 which is concave and convex relative to the surface is arranged on the outer surface of the lower plate body 24, so that lift force is generated by the shell body 1 and eliminated by the connecting plate 102.

Figure 9:
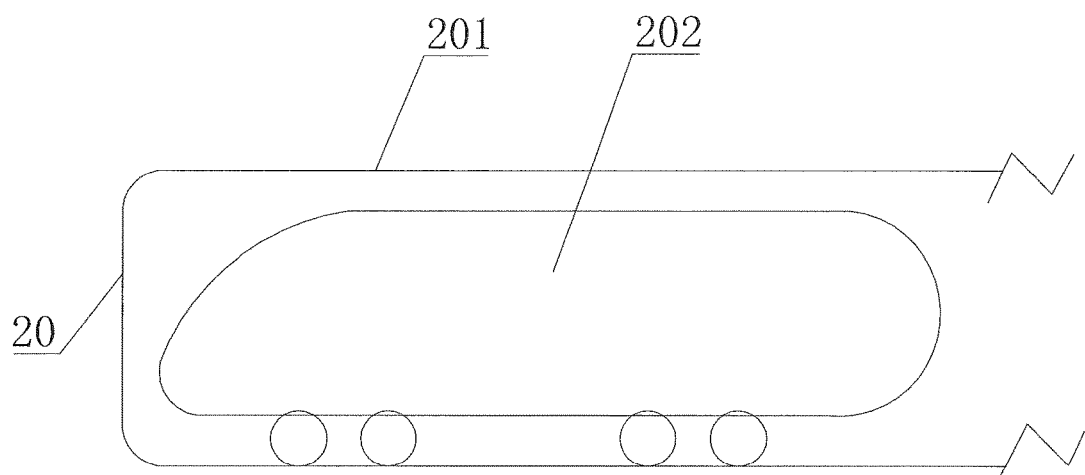
FIG. 9 is an integral structural schematic diagram of a suspension train operating system of the invention.

Please see FIG. 9, the invention further provides a third suspension train 202 operating system based on the same idea, the suspension train 202 operating system comprises a non-vacuum cover body 20 and the suspension train 202, and the suspension train 202 travels in the cover body 20.

The invention further provides a fourth suspension train operating system based on the same idea, the suspension train 202 operating system comprises a non-vacuum cover body 20 and the suspension train 202, and the outer surface of the non-vacuum cover body 20 is covered with a solar device 201; the suspension train 202 is driven by solar energy to travel in the cover body 20.

The Invention has the Following Beneficial Effects that:

(1) The shell body 1 accounting for over 90% of the weight of the train serves as the whole carrying space, the shell body 1 generates lift force to be suspended when the train travels in the natural state, the shell body is not needed to integrally suspend by a certain distance, and the downward gravity generated by the shell body serving as the load space is overcome through the upward lift force; the lift force is reduced or eliminated by the wheels 7 at the moment, so that the ground holding force of the wheels 7 is increased, and the train travels more stably and safely. The shell body generates the lift force to be suspended, the wheels 7 eliminate the lift force, and the two mutually-contradictory technical structures are combined harmoniously in this way.

(2) The suspension effect identical with the suspension effect of a magnetic suspension train 202 is achieved by means of the lift force inevitably generated when the high-speed train travels in the natural state at a high speed; however, the cost of the magnetic suspension train is multiple times that of the suspension train 202 of the invention; the effect of greatly reducing the cost of the train is achieved.

(3) The suspension train 202 is arranged in the ordinary non-vacuum cover body 20, a relative vacuum state is formed within the length range of the train, and the relative vacuum state is formed within a certain distance after the train travels by a certain distance, so that the train is made in the suspension state and meanwhile travels in the relative vacuum state at a high speed, and accordingly the speed per hour of the train can reach 1000 kilometers or over quite easily.

(4) The outer surface around the cover body 20 is covered with the solar device 201, a large-scale solar power generation station can be formed by the cover body which is hundreds of kilometers long or thousands of kilometers long, and thus sufficient energy guarantee is provided to drive the high-speed suspension train 202 to travel; in this way, a railway system, driven by solar energy, of the high-speed suspension train 202 is created.

(5) The shell body 1 accounting for over 90% of the weight of the high-speed suspension train generates lift force to be suspended when the high-speed suspension train travels in the natural state at a high speed, the wheels 7 actually bear less than 10% of the weight of the train at the moment, and energy is consumed according to the weight; the actual energy consumption of the high-speed train is obviously reduced, and a power supply system along a high-speed rail line can be removed through reasonable design, so that the construction cost of a high-speed rail can be reduced by at least about one quarter, and accordingly the use cost and the maintenance cost of a high-speed rail system are further reduced.

(6) Under the effect of the strong suction of the engine 17, the flow speed in the outer fluid channel 12 can be multiple times higher or even over ten times higher than the flow speed in the inner fluid channel 13 in the natural state quite easily, so that an extremely-large pressure difference transferring ring is formed between the inner fluid channel 13 and the outer fluid channel 12; the fluid pressure transferring direction of the pressure difference transferring ring is opposite to the direction of inward fluid pressure around the pressure difference transferring ring, so that the corresponding quantity of fluid pressure is counteracted according to the quantity of the fluid pressure transferred outwards by the pressure difference transferring ring, the actual energy utilization rate is increased to a corresponding extent, the corresponding quantity of propelling force sources are obtained, and accordingly a first pair of power sources of the invention are obtained.

(7) The larger the positive-negative pressure difference between the low air pressure of the windward side of the front portion of the shell body 1 of the train and the high air pressure of the leeward side of the rear portion of the shell body 1 of the train is, the larger the pressure difference propelling force generated by the train from back to front due to the continuity of the fluid is; the pressure difference propelling force generated between the front portion and the rear portion of the train serves as a second propelling force source of the invention; the second propelling force of the invention can be even not less than the propelling force generated by a power device of a traditional train through reasonable design.

In this way, a larger propelling force source is formed by the first propelling force and the second propelling force of the invention jointly to drive the suspension train to travel at a high speed in an energy-saving mode.

First Embodiment

Please see FIG. 1 to FIG. 3; a suspension train is provided, and the suspension train comprises a shell body 1 serving as a train body; a flow disturbing plate 51 is arranged at the position a certain distance away from a lower portion of the shell body 3 of the shell body 1, namely a fluid channel 4 with the front portion and the rear portion communicating with the outside is formed between the lower portion of the shell body 3 of the shell body 1 and the inner surface of the flow disturbing plate 51 at certain intervals; a flow disturbing surface 5 which lengthens a fluid passing path and is concave and convex relative to the surface is arranged on the lower surface of the flow disturbing plate 51, so that the fluid passing path is made not shorter than the path of fluid passing through an upper portion of the shell body 2, and accordingly lift force is eliminated; preferably, the path of the fluid passing through the lower portion of the shell body 3 is made approximately equal to the path of the fluid passing through the upper portion of the shell body 2, so that the lift force is generated by the shell body 1 and eliminated by wheels 7 correspondingly.

Please see FIG. 3; a supporting plate 6 is arranged on connecting shafts 8 between the left wheels 7 and the right wheels 7 at the bottom of the train, and the supporting plate 6 is flexibly connected with the lower surface of the flow disturbing plate 51 through connecting devices 11; the wheels 7 are prevented from being driven to generate lift force while the lift force is generated by the shell body 1 above the connecting devices 11, and on the contrary, the lift force is eliminated by the wheels below the connecting devices 11.

The flow disturbing surface 5 is arranged on part of the lower surface or the whole lower surface of the flow disturbing plate 51 at the bottom of the train, so that the path of the fluid passing through the upper portion of the shell body 2 of the shell body 1 of the train is made approximately equal to the path of the fluid passing through the lower portion of the shell body 3 at the bottom of the train, namely the path of the fluid passing through the top of the train is approximately the same as the path of the fluid passing through the bottom of the train; under the effect of the pressure difference generated on this basis, the lift force can be extremely easily generated by the shell body 1 of the train and be extremely easily reduced or eliminated by the wheels 7 correspondingly.

The fluid channel 4 with the front portion and the lower portion communicating with the outside is formed between the upper surface 1, which is preferably a plane, of the flow disturbing plate 5 at the bottom of the train and the lower portion of the shell body 3 which is relatively a plane at certain intervals.

Preferably, magnetic devices 9 are arranged between the supporting plate 6 and the flow disturbing plate 51, and the magnetic properties of the magnetic devices 9 are opposite, so that repulsive force is generated by the magnetic devices 9; when the lift force is generated by the shell body 1, the repulsive force generated by the magnetic devices 9 assists the shell body in better generating the lift force to be suspended.

Wherein, each left wheel 7 and the corresponding right wheel 7 which are connected through the corresponding connecting shaft 8 form a set, and the connecting shafts 8 of the two or more sets of wheels 7 are connected into a whole through the supporting plate 6; the upper surface of the supporting plate 6 is a plane, and the lower surface, opposite to the ground, of the supporting plate 6 is provided with the flow disturbing surface 5, so that the fluid passing path is further lengthened; the flow speed of the fluid passing through the lower surface of the supporting plate 6 is made higher than the flow speed of the fluid passing through the upper surface of the supporting plate 6, so that the pressure difference is generated locally; although the area of the two sets of wheels 7 connected into a whole through the supporting plate 6 is not large, a supporting plate 6 structure is formed by over two sets of wheels 7, all the downward pressure difference generated on the supporting plate 6 structure can directly act on the wheels 7 below the supporting plate 6, so that the lift force of the wheels 7 is reduced or eliminated, the ground holding force of all the wheels 7 of the train is increased, and the safety is improved.

Wherein, the fluid channel 4 with the front portion and the rear portion communicating with the outside is formed between the upper surface, which is plane, of the flow disturbing plate 51 at the bottom of the train and the lower portion of the shell body 3 which is also a plane, a channel inlet 41 and a channel outlet 42 are formed in the front end and the rear end of the train body correspondingly and communicate with the fluid channel 4, and the front portion and the rear portion of the fluid channel 4 communicate with the outside through the channel inlet 41 and the channel outlet 42.

Wherein, the flow disturbing surface 5 which is concave and convex relative to the surface is arranged on the lower surface of the flow disturbing plate 51 at the bottom of the train, so that the path of the fluid passing through the lower surface of the flow disturbing plate 51 is made longer than the path of the fluid passing through the upper surface of the flow disturbing plate 51, namely the path of the fluid passing through the lower surface of the flow disturbing plate 51 is also longer than the path of the fluid passing through the fluid channel 4; the flow speeds are different due to the facts that the path of the fluid passing through the upper surface of the flow disturbing plate 51 is different from the path of the fluid passing through the lower surface of the flow disturbing plate 51 and the path of the fluid passing through the lower surface of the flow disturbing plate 51 is also different from the path of the fluid passing through the fluid channel 4, the larger the flow speed difference between the flow disturbing plate 51 and the fluid channel 4 is, the larger the generated downward pressure difference is, and accordingly the lift force generated in the traveling process of the wheels 7 is reduced or eliminated through the pressure difference.

Wherein, due to the fact that the front portion and the rear portion of an upper portion of the shell body 2 of a shell body of a traditional high-speed train are in arc shapes, unsafe factors are caused by the pressure difference and lift force generated between the upper portion of the shell body 2 and a planar lower portion of the shell body 3, and consequentially the weight of a train body has to be increased to overcome the lift force; energy is consumed according to the weight, and thus energy consumption is increased to a greater extent.

The invention is the same as the traditional train in that the pressure difference and lift force are also generated between the arc-shaped upper portion of the shell body 2 and the planar lower portion of the shell body 3; the invention is different from the traditional train in that the flow disturbing surface 5 which lengthens the fluid passing path to a greater extent and is concave and convex relative to the surface is arranged on part of the surface or the whole surface of the original arc-shaped upper portion of the shell body 2, the larger pressure difference and lift force are generated between the arc-shaped upper portion of the shell body 2 and the planar lower portion of the shell body 3, and thus the shell body 1 of the train can be better integrally suspended. The shell body is not needed to integrally suspend by a certain distance, and the downward gravity is overcome through the upward lift force; the more the downward gravity is overcome by the lift force, the less the weight of the train is borne by the wheels, and more energy is saved.

Meanwhile, repulsive force is generated due to the fact that the magnetic properties of the magnetic devices 9 are opposite, so that the shell body 1 is further assisted in better generating the lift force when the train travels at a high speed, and the wheels 7 are assisted in eliminating the lift force at the same time.

Furthermore, the flow disturbing surface 5 is arranged on the surface of the arc-shaped upper portion of the shell body 2 to lengthen the fluid passing path, preferably, the path of the fluid passing through the flow disturbing surface 5 on the lower surface of the flow disturbing plate 51 is approximately equal to the path of the fluid passing through the upper portion of the shell body 2, and thus the fluid is made to pass around the train at a high speed without generating the pressure difference between the upper portion and the lower portion; in the special fluid distribution state, the lift force can be generated by the whole shell body 1 of the train most easily and be eliminated by the wheels 7 most easily in the traveling process of the train correspondingly.

The shell body 1 of the train generates lift force integrally, the wheels 7 eliminate the lift force, and the mutually-contradictory structures are combined harmoniously; suspension of the train in the natural state is achieved, the speed of the train is remarkably increased, and energy consumption is effectively reduced.

Specifically, the flow disturbing surface 5 is formed by combining one or more kinds of arcs or triangles or trapezoids or arcs which are concave and convex relative to the surface or by combining a plurality of spiral flow disturbing strips or can be a water ripple surface which is symmetrically formed in the longitudinal direction or symmetrically or asymmetrically formed in the longitudinal direction and the transverse direction correspondingly and used for lengthening the fluid passing path, and thus the path of the fluid passing through the lower surface of the flow disturbing plate 51 at the bottom of the train and the path of the fluid passing through the upper portion of the shell body 2 are lengthened to a greater extent.

The connecting devices 11 are preferably of non-rigid flexible structures which are elastic, hydraulic, pneumatic and the like, and the positions of the supporting plate 6 and the flow disturbing plate 51 at the bottom of the train can be fixed through the connecting devices 11; since the flexible structures can prevent the wheels 7 from being driven to generate lift force while the shell body 1 generates lift force, shaking generated during traveling of the train can be effectively reduced at the same time.

Furthermore, the flow disturbing plate 51 is connected with the supporting plate 6 through a plurality of connecting devices 11, the supporting plate 6 is connected to the connecting shafts 8, and the connecting shafts 8 are further connected with the wheels 7.

Furthermore, the flow disturbing plate 51 can be directly connected with the connecting shafts 8 through the connecting devices 11 by removing the supporting plate 6, and the connecting shafts 8 are connected with the wheels.

Furthermore, as is shown in FIG. 4, the connecting devices 11 are arranged in the fluid channel 4 between the lower portion of the shell body 3 and the flow disturbing plate 51, and the flow disturbing plate 51 is connected with the connecting shafts 8 and the wheels directly or through various other connecting methods. The magnetic devices 9 are arranged in the fluid channel 4 with the larger area and can generate larger repulsive force so that the shell body 1 above the connecting devices 11 can generate larger lift force, and the connecting shafts 8 and the wheels connected with the flow disturbing plate 51 below the connecting devices can eliminate the lift force.

The magnetic devices 9 can be permanent magnet materials or other magnetic devices 9 which can generate larger electromagnetic fields after being electrified, and preferably, the magnetic devices 9 are each of a plate-like structure; according to the principle that identical magnetic poles repel each other and opposite magnetic poles attract each other, the magnetic devices 9 with the opposite polarities can generate repulsive force, and the repulsive force generated by the magnetic devices 9 in the state that lift force has already been generated in the traveling process of the train can better assist the shell body 1 in generating upwards lift force to be suspended.

The speed per hour of the high-speed train is generally 200-300 kilometers when the high-speed train travels at a high speed, extremely-large lift force is inevitably generated when the train is in the natural state at the speed, and the lift force of the high-speed train is reasonably utilized and further increased in the invention so that the shell body 1 of the train can be well suspended.

Specifically, the fluid enters the fluid channel 4 from the channel inlet 41 in the front end of the shell body 1 of the train when passing around the train at a high speed and is discharged to the outside from the channel outlet 42 in the rear end of the shell body 1 of the train; since the lower surface of the low disturbing plate 51 arranged at the bottom of the train is locally or integrally the flow disturbing surface 5, the path of the fluid passing through the bottom can be approximately equal to the path of the fluid passing through the top, namely the path of the fluid passing through the upper portion of the shell body 2, and thus in the fluid distribution state, no upward or downward pressure difference is generated around the train; at the moment, the shell body 1 can generate the lift force to be suspended quite easily, and the wheels 7 can reduce or eliminate the lift force.

Specifically, due to the continuity of the fluid, the fluid in the fluid channel 4 and the fluid around the fluid channel generate two effects jointly:

(1) The fluid flows downwards to make the shell body of the train generate lift force to be suspended.

Specifically, when the speed per hour of the train in the high-speed traveling state is 200-300 kilometers, lift force is inevitably generated in the natural state, the path of the fluid passing through the arc-shaped upper portion of the shell body 2 is made longer than the path of the fluid passing through the planar lower portion of the shell body 3, namely the path of the fluid passing through the upper portion of the shell body 2 is longer than the path of the fluid passing through the planar interior of the fluid channel 4, and thus an extremely-large pressure difference is generated between the upper portion and the lower portion of the shell body 1 due to the different flow speeds; in this way, downward gravity generated by the self weight, the load and the gravitational acceleration of the shell body 1 serving as the load space is changed into upward lift force to overcome the downward gravity so that the train can travel in a suspension mode, and the larger the pressure difference generated between the upper portion and the lower portion of the shell body is, the more the gravity is overcome.

Furthermore, since the flow disturbing surface 5 which is concave and convex relative to the surface is arranged on the surface of the arc-shaped upper portion of the shell body 2, larger pressure differences are generated between the arc-shaped upper portion of the shell body 2 and the planar lower portion of the shell body 3 as well as between the arc-shaped upper portion of the shell body 2 and the fluid channel 4 to increase the overall lift force of the shell body 1, and accordingly the shell body 1 of the train is better integrally suspended above the supporting plate 6 connected with the wheels 7.

(2) The fluid flows downwards to make the wheels 7 integrally reduce or eliminate lift force.

Specifically, the path of the fluid passing through the lower surface of the flow disturbing plate 51 at the bottom of the train is longer than the path of the fluid passing through the upper surface, corresponding to the lower surface, of the flow disturbing plate 51 at the bottom of the train, namely the path of the fluid passing through the lower surface of the flow disturbing plate 51 is longer than the path of the fluid passing through the planar interior of the fluid channel 4, and an extremely-large downward pressure difference is generated between the fluid channel 4 and the lower surface of the flow disturbing plate 51, so that the lift force generated by the wheels 7 is eliminated, and the ground holding force of the wheels 7 is increased; in this way, the train is more stable and safer when the train steers and brakes emergently or an emergency occurs due to the fact that the ground holding force is stronger.

Since the ground holding force of the wheels 7 is increased, the invention is different from the traditional train according to which serious unsafe factors are caused by the lift force generated in the high-speed traveling process in that lift force is eliminated by the wheels 7 accounting for less than 10% of the total weight of the train, the shell body 1, serving as the load space, accounting for 90% of the total weight of the train generates lift force to be suspended like the magnetic suspension train, and the speed of the train can be remarkably increased.

The wheels 7 bear less than about 10% of the actual total weight of the train, and energy is consumed according to the weight; when the wheels 7 are driven by a power device to rotate, the actual energy consumption is extremely small, and the effect of obviously reducing the energy consumption is achieved; meanwhile, since the lift force of the wheels 7 is eliminated, the ground holding force of the wheels 7 is increased, train definitely travels by one circle after the wheels 7 of the train rotate by one circle, more energy is saved, and the safety is higher.

First, the construction cost of the magnetic suspension train 202 is extremely high; secondly, extremely-high operating cost is needed when the train travels, and a huge amount of electric power needs to be consumed to generate extremely-large electromagnetic fields to make the train suspended.

However, the ordinary speed per hour of the high-speed train 202 of the invention in the natural state is 200-300 kilometers, and lift force is inevitably generated to make the train suspended; the lift force which is inevitably generated in the natural state is reasonably used for making the train travel in the suspension mode, and the construction cost and operating cost of the ordinary high-speed train are multiple times lower than those of the magnetic suspension train.

The shell body 1, serving as the load space, accounting for 90% of the total weight of the suspension train 202 generates lift force to be suspended and is suitable for various power-driven trains, and the train can travel at a higher speed in an extremely energy-saving mode, so that a power supply system along a train line of the magnetic suspension train 202 can be removed, and accordingly the construction cost and the maintenance cost of a high-speed rail system are further obviously reduced.

A Second Embodiment

As is shown in FIG. 4 and FIG. 5, another suspension train 202 is provided, the suspension train is different from the suspension train in the first embodiment in that an outer fluid channel 12 and an inner fluid channel 13 which surround a shell body 1 of the train are sequentially formed around the two sides of the shell body 1 and an upper portion of the shell body 2 (except a lower portion of the shell body 3) from outside to inside, the inner fluid channel 13 communicates with the outside through a plurality of communication pipes 16 and a plurality of second air ports 15 formed in the outer surface of the shell body 1, and the outer fluid channel 12 communicates with the outside through a plurality of first air ports 14 formed in the outer surface of the shell body 1; an engine 17 is arranged in an exhaust port 18 formed in the rear portion of the shell body of the train, an air suction port of the engine 17 communicates with the first air ports 14 through the outer fluid channel 12, the fluid sprayed out by the engine 17 at a high speed drives the train to travel, and thus the structure is simpler and more effective than a driving system of a traditional train.

Due to the facts that the venting areas of the first air ports 14 are much larger than the venting areas of the second air ports 15 and the first air ports 14 communicate with the air suction port of the engine 17, more fluid in the outside can be sucked into the outer fluid channel 12 more rapidly from the first air ports 14 through the engine 17.

When the train travels at a high speed, under the effect of the strong suction of the engine 17, the fluid around the first air ports 14 is sucked into the outer fluid channel 12 at a high speed by the fluid in the outside through the multiple first air ports 14 which are evenly distributed in the shell body 1, and thus an inner high-speed fluid layer and an outer high-speed fluid layer which communicate with each other and have approximately equal extremely-high flow speeds are formed around the multiple first air ports 14 or even on the whole surface of the shell body 1 and in the inner fluid channel 12; the inner fluid channel 13 in the natural flow speed state communicates with the outside through the multiple communication pipes 16 with small venting areas and the multiple second air ports 15 which are formed in the outer surface of the shell body 1, the flow speed of the inner fluid channel 13 is even lower than the flow speed of the fluid outside the train, or barriers are arranged to make the flow speed of the inner fluid channel 13 even lower, so that a pressure difference transferring ring from inside to outside is formed between the outer fluid channel 12 and the inner fluid channel 13 due to the different flow speeds.

At this moment, the high pressure generated by the low-flow-speed fluid in the inner fluid channel 13 transfers the pressure difference to the low pressure generated by the high-flow-speed fluid on the high-speed fluid layer on the surface of the shell body 1 in the natural state through the communication pipes 16 and the multiple second air ports 15, so that a pressure difference transferring ring from inside to outside is formed around the train; due to the fact that pressure direction, from inside to outside, of the pressure difference transferring ring is opposite to the fluid pressure direction, from outside to inside, in the environment around, the pressure difference and the fluid resistance can be mutually counteracted, and the fluid resistance is reduced according to the quantity of the counteracted fluid pressures in the two different directions.

Furthermore, the communication pipes 16 can also be removed, so that the structure is simpler and more convenient to use; the inner fluid channel 13 directly communicates with the outer fluid channel 12 through the multiple small second air ports 15, and the outer fluid channel 12 communicates with the outside through the multiple big first air ports 14; in other words, the inner fluid channel 13 transfers the pressure difference to the low pressure generated by high-flow-speed fluid on the high-speed fluid layers in the outer fluid channel 12 and on the shell 1 through the multiple second air ports 15 with small areas, and thus an outward pressure difference transferring ring is generated around the train.

Due to the fact that the outward fluid pressure of the pressure difference transferring ring is opposite to the inward pressure of the fluid around the train, the two fluid pressures in different directions encounter around the shell body 1 and are mutually counteracted, the corresponding quantity of fluid pressure is reduced according to the quantity of the counteracted fluid pressures, and accordingly the corresponding quantity of propelling force sources are converted from the reduced fluid pressure; in this way, the fluid resistance is obviously reduced through the pressure difference transferring ring, and the reduced fluid resistance is converted into the propelling force sources correspondingly.

Furthermore, by controlling the engine 17, the flow speed of the fluid in the outer fluid channel 12 is controlled, the pressure difference generated between the outer fluid channel 12 and the inner fluid channel 13 is controlled accordingly, the quantity of the resistance transferred by the pressure difference transferring ring is controlled, the influence of the fluid resistance on the traveling of the train is controlled accordingly, and thus control over the speed of the train is achieved based on the one-to-one corresponding relation.

In this way, a first power source of the invention is as follows:

'An inner fluid layer and an outer fluid layer which have different flow speeds are formed around a movement device; if the flow speed of the inner layer is lower than the flow speed of the outer layer, the power source is obtained; otherwise, power consumption is increased.'

During the traveling of any movement device in fluid, the fluid flowing near the shell body 1 forms the inner fluid layer with the flow speed equal to the moving speed of the movement device, and the flow speed of the inner fluid layer is decreased gradually towards the outside till the outer fluid layer with the flow speed equal to the environment fluid speed within a larger range, namely the flow speed of the inner layer is higher than the flow speed of the outer layer within a large range.

The high pressure generated by the low flow speed of the outer layer inevitably transfers the pressure difference to the low pressure generated by the high flow speed of the inner layer, higher fluid pressure of the outer layer within a large range in the environment around is actually guided to the movement device, and consequentially any movement device including the train has to consume 90% of energy to overcome the fluid resistance and the utilization rate of the energy actually used for driving the train to travel is only about 10%. This is the new understanding about the reason for the generation of the fluid resistance of the invention.

In the two hundred years since the Industrial Revolution, no theory or method which can effectively reduce the fluid resistance has been made available; in those generally skilled in the field, higher fluid pressure in the environment around is guided to the movement device, the energy utilization rate is only about 10%, 90% of energy is used for overcoming the fluid resistance, and the extremely-abnormal current situation is regarded as a normal natural phenomenon and is taken for granted.

The invention is contrary to those generally skilled in the field in that the flow speed of the inner layer is lower than the flow speed of the outer layer; the larger the flow speed difference between the inner layer and the outer layer is, the more the fluid resistance can be counteracted, and the more the first power sources converted from the 90% of energy used for overcoming the fluid resistance are.

The unique difference between the invention and the general common sense is that the higher fluid pressure in the environment around is guided to the movement device in the general common sense, however, the power source guides the fluid pressure to the outside; the direction of the fluid pressure in the invention is different from the direction of the fluid pressure in the general common sense, and thus results are opposite accordingly.

Obviously, under the effect of the strong suction of the engine 17, the flow speed in the outer fluid channel 12 can be several times or even over ten times higher than the low flow speed in the inner fluid channel 13 quite easily, so that a pressure difference transferring ring is formed; through the over ten times of pressure difference transferring ring generated between the inner layer and the outer layer, propelling force sources can be converted from the 90% of energy consumed by the traditional movement device for overcoming the fluid resistance quite easily, for example, if 10% of the fluid pressure is transferred outwards and counteracted with the fluid pressure of the fluid around, at least over 50% of propelling force sources of the movement device can be converted from the 90% of the energy consumed for overcoming the fluid resistance; if 20% or 30% or 60% or even more fluid resistance is transferred outwards, the actual utilization rate of the high-speed train can be multiplied. If the over ten times of pressure difference transferring ring is generated, more rather than only 10% of the fluid pressure can be counteracted.

The discovery of the first power source of the invention will bring an energy revolution and profoundly influence the future development of various transportation vehicles and high-speed trains.

At the moment, the fluid resistance is obviously reduced through the pressure difference transferring ring, so that a larger propelling force source is obtained; meanwhile, under the effect of the strong suction of the engine, the flow speeds around the upper portion and the two sides of the shell body 1 accounting for over 90% of the weight of the train are made extremely high; a larger pressure difference is generated between the formed pressure difference transferring ring and the flow speed of the lower portion of the shell body 3 in the natural state, and thus the shell body 1 can generate larger lift force to be suspended.

As is shown in FIG. 4, a pressure difference is generated between the upper surface and the lower surface of the flow disturbing plate 51 at the moment, so that lift force is eliminated by the wheels 7, the ground holding force of the wheels 7 is increased, and it is guaranteed that the train travels more stably and safely. The shell body 1 generates lift force to be suspended, the wheels 7 eliminate the lift force, the contradictory structures of lift force generation and lift force elimination are combined harmoniously.

Furthermore, control devices which can control the opening and closing or angle change of the first air ports 14 are arranged on the first air ports 14, and thus control over the train according to specific requirements is achieved. Specifically, the multiple first air ports 14 are formed in the front-end area, namely the windward side of the front portion of the train, of the shell body 1 of the train and communicate with the outer fluid channel 12 and the air suction port of the engine 17, and the fluid on the windward side of the train is sucked into the outer fluid channel 12 from the multiple first air ports 14 at a high speed through the strong suction force generated by the engine, so that a high negative-pressure area is formed on the windward side of the front end of the train, and a power propelling area, namely a high positive-pressure area, is formed on the leeward side of the rear portion of the shell body 1 of the train by the high-speed fluid sprayed out by the engine 17.

Furthermore, the multiple first air ports 14 are formed in the windward side formed from the maximum cross section of the shell body 1 to the large area of the front end and communicate with the outer fluid channel 12 and the air suction port of the engine 17, so that the high negative-pressure area is formed on the windward side of the front end of the train, and the power propelling area, namely the high positive-pressure area, is formed on the rear portion of the train.

Since the fluid can reach the rear portion continuously at the same time along different paths around the train, an extremely-large pressure difference is formed between the high negative-pressure area on the windward side of the front portion of the train and the high positive-pressure area on the leeward side of the rear portion of the train in the whole length direction, then the high positive-pressure area on the leeward side of the rear portion of the train inevitably transfers the pressure difference to the high negative-pressure area on the windward side of the front portion of the train along the shell through the integral continuity of the fluid, the pressure difference is the propelling force, and the pressure difference generated from back to front serves as a second propelling force source of the train of the invention.

In this way, on the premise that no extra power is increased, the novel second propelling force source provided for the high-speed train by the invention is as follows:

The pressure difference generated between the high negative-pressure area on the windward side of the train and the high positive-pressure area on the leeward side of the train serves as the propelling force source.

The larger the positive-negative pressure difference between the windward side of the front portion of the shell body 1 of the train and the leeward side of the rear portion of the shell body 1 of the train is, the larger the second propelling force generated from back to front is; the second propelling force can be even larger than the original propelling force of the train through reasonable design.

In this way, on the premise that no extra power is increased, a larger propelling force source is formed by the first propelling force and the second propelling force of the invention and the original propelling force of the train jointly, and the larger propelling force source drives the train to travel at a high speed in an energy-saving mode.

The larger propelling force source is formed by the first propelling force and the second propelling force jointly, the cost and energy consumption of the suspension train 202 of the invention are several times lower than those of the existing magnetic suspension train, the speed is higher, the suspension train 202 is more stable and safer, the construction cost and operating cost of the suspension train are also reduced by several times, and thus the high-speed suspension train which is of a novel theory and structure and generates lift force in the natural state to be suspended is created.

A Third Embodiment

As is shown in FIG. 5, the third embodiment is different from the above embodiment in that an outer fluid channel 12 and an inner fluid channel 13 are formed around the upper portion, the lower portion, the left portion and the right portion of a shell body 1 of a train, and an air suction port of an engine 17 communicates with a plurality of first air ports 14 around the upper portion, the lower portion, the left portion and the right portion of the train through the outer fluid channel 12. Under the effect of the strong suction generated by the engine 17, a multiplied pressure difference transferring ring can be generated between the inner layer and the outer layer quite easily, most fluid resistance is reduced, and accordingly the actual energy utilization rate of the train is further multiplied. In addition, a flow disturbing surface 5 is arranged at the bottom of the train, so that the path of the fluid passing through the bottom of the train is made longer than the path of the fluid passing through the upper portion of the train, lift force is eliminated, accordingly the ground holding force is stronger during traveling of the train, and the train travels more stably and safely. Control devices which can control the opening and closing or angle change of the first air ports 14 are arranged on the first air ports 14, the lift force generated during traveling of the train can be eliminated by opening the first air ports 14 in the bottom of the train to make the flow speed of the bottom of the train higher than the flow speed of the upper portion of the train, and in the similar way, further control over the train according to specific requirements can be achieved by controlling the control devices.

A Fourth Embodiment

A suspension train provided by the embodiment is different from the suspension train provided by the second embodiment in that the engine 17 is removed (the embodiment is described according to FIG. 1 to FIG. 5, and although the engine is shown in FIG. 5, the invention provides the description of the suspension train not provided with the engine). A flow disturbing surface 5 which is concave and convex relative to the surface and lengthens a fluid passing path is arranged in an outer fluid channel 12; preferably, the flow disturbing surface 5 can be formed by evenly arranging a plurality of spiral flow disturbing strips which have certain lengths and are provided with flow disturbing surfaces and spiral flow disturbing surfaces, so that the fluid passing path is further lengthened; through the special structures of the spiral flow disturbing strips, fluid can pass through the outer fluid channel 12 circle by circle, the path of the fluid passing through the outer fluid channel can be multiple times longer than the path of the fluid passing through an inner fluid channel 13 quite easily, and accordingly an outward pressure difference transferring ring is generated.

The outer fluid channel 12 surrounding the train communicates with an exhaust port 18 in the rear portion of a shell body 1; due to the facts that the venting areas of second air ports 15 of the inner fluid channel 13 are small and the inner fluid channel 13 is not provided with a flow disturbing surface 5 or an exhaust port 18, flowing in the inner fluid channel 13 is unsmooth, the flow speed is low, and consequentially the flow speed in the inner fluid channel 13 is lower than the flow speed in the outer fluid channel 12 and is also lower than the flow speed outside the train.

Through the above structure, the pressure difference is generated between the inner fluid channel 13 and the outer fluid channel 12 due to the different flow speeds, so that a larger pressure difference transferring ring is formed, more fluid resistance is reduced, and accordingly more first propelling force sources are obtained.

A Fifth Embodiment

As is shown in FIG. 6 to FIG. 8, the fifth embodiment is different from the first embodiment in that a connecting plate 102 is further included, and the connecting plate comprises an upper plate body 23 and a lower plate body 24 which are of plate-like structures and are arranged on the upper portion and the lower portion of the shell body 1; the lower plate body 24 is connected with the wheels 7, and two or more supporting frames 104 are connected between the upper plate body 23 and the lower plate body 24, so that the integral structure of the connecting plate 102 is formed. w.

The shell body 1 serves as the load space of the train and is arranged in the middle of the connecting plate 102; specifically a first fluid channel 43 and a second fluid channel 44 which communicate with each other on the front portion and the rear portion are formed between the upper plate body 23 of the plate-like structure and a shell body upper surface 21 as well as between the shell body lower surface 22 and the lower plate body 24 and located in the upper portion and the lower portion of a train body correspondingly, and the front portions and rear portions of the first fluid channel 43 and the second fluid channel 44 communicate with the outside through a channel inlet 41 and a channel outlet 42 correspondingly.

A flow disturbing surface 5 which is concave and convex relative to the surface is arranged on the outer surface, opposite to the earth surface, of the lower plate body 24 at the bottom of the train body, so that the path of the fluid passing through the lower plate body 24 is made longer than the path of the fluid passing through the upper plate body 23, the downward pressure difference is generated, and accordingly lift force is eliminated by the connecting plate 102 connected with the wheels.

The shell body 1 is arranged between the upper plate body 24 of the plate-like structure and the lower plate body 24 of the plate-like structure, and through the pressure difference and lift force generated between the arc-shaped shell body upper surface 21 and the planar shell body lower surface 22 of the shell body 1, an inner shell 101 can be suspended between the first fluid channel 43 in the upper portion and the second fluid channel 44 in the lower portion.

The upper plate body 23 and the lower plate body 24 of the connecting plate 102 are arranged on part of the train body or the whole train body, namely the upper plate body 23 and the lower plate body 24 of the connecting plate 102 can be arranged on the middle portion, the front portion and the rear portion of the upper portion of the shell body 1 and the middle portion, the front portion and the rear portion of the lower portion of the shell body 1 and can also be arranged on the whole upper portion and the whole lower portion of the whole shell body 1, and at the moment, the upper plate body 23 and the lower plate body 24 of the connecting plate 102 can correspond to the positions of windshields on the front portion and the rear portion of the train, or another layer of glass is arranged; in this way, the connecting plate 102 can be correspondingly arranged on part of the shell body 1 or on the whole shell body 1.

The connecting plate 102 comprises the upper plate body 23 located on the upper portion of the train body and the lower plate body 24 located on the lower portion of the train body; the lower plate body 24 is preferably of the reinforced plate-like structure and is connected with the wheels.

Generally, the upper portion of a train body of a high-speed train is in an arc shape, the lower portion of the train body of the high-speed train is a plane, and thus lift force is generated in the traveling process of the train due to the effect of the continuity of the fluid around the train, and accordingly the weight of the train body has to be increased to overcome the lift force; the invention is different from the ordinary high-speed train in that based on the same principle, the pressure difference is generated by the shell body 1 due to the different flow speeds of the arc-shaped shell body upper surface 21 and the planar shell body lower surface 22, and lift force is generated by the inner shell 101 accordingly; meanwhile, the lift force is eliminated by the connecting plate 102 formed by connecting the upper plate body 23 and the lower plate body 24 connected with the wheels through the connecting frames 104.

The lift force is eliminated by the connecting plate 102 and generated by the shell body 1, and the structures which seem mutually contradictory are reasonably combined in this way.

Furthermore, the flow disturbing surface 5 which is concave and convex relative to the surface and lengthens a fluid passing path is arranged on part of the upper surface or the whole surface of the arc-shaped shell body upper surface 21, so that a larger pressure difference is generated between the arc-shaped shell body upper surface 21 and the planar shell body lower surface 22, and accordingly the shell body 1 generates larger lift force to be suspended.

Furthermore, wings 103 are arranged on the two sides or the upper portion of the shell body 1 and connected with the shell body 1, so that the larger pressure difference and lift force are generated between the upper portion and the lower portion of the shell body 1, and accordingly the shell body 1 can be better integrally suspended between the first fluid channel 43 and the second fluid channel 44.

Preferably, the wings 103 are locally arranged on the front portion, the middle portion and the rear portion of the shell body upper surface 21; or the wings 103 are integrally in the length direction of the shell body upper surface 21; the upper surfaces of the wings 103 are arc-shaped surface, the lower surfaces of the wings 103 are planes, and the wings 103 are similar to the wing structures of airplanes.

Furthermore, flow disturbing surfaces 5 are arranged on the arc-shaped upper surfaces of the wings 103, so that the fluid passing path is further lengthened, larger pressure differences are generated between the upper surfaces and the lower surfaces of the wings, and accordingly the shell body 1 can generate larger lift force to be suspended.

Specifically, the angles or shapes of the wings 103 can be changed through the control of a control mechanism, and the wings extend outwards in parallel or in an angled mode in the left-right direction or the front-back direction of the central axis of the train body and stretch out of the train body by certain distances, so that wing surfaces are formed; the windward areas of the wing surfaces of the wings 103 are enlarged, the fluid passing path is lengthened, and preferably the windward areas of the wings 103 can be controlled in a user-defined mode through the control mechanism.

Furthermore, as is shown in FIG. 8, the wings 103 are preferably arranged on the left side face and the right side face of the shell body 1, and for preventing the sight of a left side window and a right side window of the shell body 1 from being affected, the wings 103 are preferably made of transparent materials; the wings on the left side face and the right side face are controlled by the control mechanism to turn upwards to be parallel to the shell body upper surface 21 when in use.

When the fluid passes through the wing surfaces, the windward area of the shell body upper surface 21 of the train body is enlarged, and the fluid passing path is lengthened, so that an extremely-large difference is generated between the shell body upper surface 21 and the shell body lower surface 22 of the planar structure due to the flow speeds, and accordingly the shell body 1can generate larger lift force more easily to be suspended.

Furthermore, the second fluid channel 44 communicating with the front portion and the rear portion of the train body is formed between the shell body lower surface 22 and the lower plate body 24, and the lower plate body 24 located at the bottom of the train body is of the plate-like structure and is connected with the wheels.

The path of the fluid passing through the lower surface of the lower plate body 24 is longer than the path of the fluid passing through the upper surface of the lower plate body 24; preferably, the upper surface of the lower plate body 24 is a plane, and the flow disturbing surface 5 is arranged on the lower surface of the lower plate body 24; preferably, the flow disturbing surface is locally or integrally arranged in the length direction of the lower surface of the lower plate body 24 at the bottom of the train body. The path of the fluid passing through the lower plate body 24 is longer than the path of the fluid passing through the upper surface of the lower plate body 24, is also longer than the path of the fluid passing through the second fluid channel 44 and is also longer than or equal to the path of the fluid passing through the upper plate body 23, so that the lift force is reduced or completely eliminated by the connecting plate 102.

One or more kinds of a plurality of arcs or a plurality of triangles or a plurality of trapezoids are combined in different geometrical shapes to form the flow disturbing surface, or one or more kinds of concave-convex arcs or concave-convex triangles or concave-convex trapezoids are combined to form the flow disturbing surface 5.

Furthermore, the shell body upper surface 21 is provided with a flow disturbing surface 5 for lengthening a fluid passing path so that the fluid can better pass through the shell body upper surface 21, a larger pressure difference is generated between the shell body upper surface 21 and the shell body lower surface 22 which is a plane, and accordingly the shell body 1 can better generate lift force to be suspended.

Furthermore, the upper plate body 23 and the lower plate body 24 of the connecting plate 102 are connected through a plurality of connecting frames 104, the shell body 1 is arranged between the upper plate body 23 of the plate-like structure and the lower plate body 24 of the plate-like structure, and the first fluid channel 43 and the second fluid channel 44 which communicate with each other on the front portion and the rear portion and located on the upper portion of the train body and the lower portion of the train body are formed between the upper portion of the train body and the lower portion of the train body.

At least two supporting frames 104 are arranged on the outer surface of the shell body 1 or pass through the interior of the shell body 1, and the supporting frames 104 can be of hollow or solid linear or strip-shaped or arc-shaped structures; preferably, the supporting frames 104 can freely penetrate through the interior of the shell body 1 and are connected with the upper plate body 23 and the lower plate body 24, and generation of lift force by the shell body 1 is not affected when the connecting plate eliminates lift force; in this way, the structure is more attractive and reasonable.

The multiple supporting frames 104 are connected with the upper plate body 23 and the lower plate body 24, so that the integral connecting plate 102 is formed by the upper plate body 23 and the lower plate body 24, the high pressure generated by the upper plate body 23 for bearing the low flow speed transfers the pressure difference to the low pressure generated by the lower plate body 24 for bearing the high flow speed, and the pressure difference is invisibly pressed on the upper plate body 23, and the upper plate body 23 can penetrate through the interior of the shell body 1 freely through the supporting frames 104, so that the lift force is completely eliminated by transferring the pressure difference from top to bottom towards the lower plate body 24.

Furthermore, due to the fact that the connecting plate 102 has to bear the pressure difference from top to bottom to make the train completely eliminate the lift force, the shell body 1 is arranged between the upper plate body 23 and the lower plate body 24 of the connecting plate 102, namely the shell body 1 is arranged in the first fluid channel 43 and the second fluid channel 44; on this premise, the effect that the shell body 1 serving as the load space is better suspended through the lift force generated between the upper surface and the lower surface of the shell body 1 in the first fluid channel 43 and the second fluid channel 44 and the lift force generated by the wings 103 is not affected.

Furthermore, a plurality of connecting devices 11 which are connected with one another are arranged between the lower plate body 24 and the shell body lower surface 22 of the second fluid channel 44; shaking generated during traveling of the train can be effectively avoided or reduced through the flexible connection of the connecting devices, and meanwhile the shell body 1 can generate lift force without driving the connecting plate 102 to generate lift force when the train travels.

Furthermore, magnetic devices 9 with opposite polarities are arranged between the lower plate body 24 and the shell body lower surface 22 in the second fluid channel 44 correspondingly, and the magnetic materials which generate repulsive force due to the opposite polarities assist the train body in better generating upward lift force.

The magnetic devices 9 can be permanent magnet materials or other magnetic devices which can generate larger electromagnetic fields after being electrified, so that larger lift force can be more easily generated under the effect of the repulsive force generated by the magnetic devices 9 in the state that lift force has already been generated by the shell body 1.

Furthermore, the first fluid channel 43 and the second fluid channel 44 which are located between the shell body 1 and the connecting plate 102 are connected through the connecting devices 11, and shaking generated in the traveling process of the train can be better reduced through the flexible connection of the connecting devices 11, and particularly the shaking generated by the train when the train brakes can be effectively reduced by arranging the connecting devices 11 on the front portion and the rear portion of the train.

Furthermore, the connecting devices 11 comprise elastic or pneumatic or hydraulic connecting devices which can achieve flexible connection; besides, the connecting devices further comprise various non-rigid connecting devices which can achieve flexible connection, and the technique is common in the field.

The speed per hour of the high-speed train is generally about 200-350 kilometers when the high-speed train travels at a high speed, great lift force is inevitably generated when the train travels in the natural state at the speed, and the shell body 1 can be well suspended if the lift force of the train is reasonably used and further increased.

Due to the fact that the shell body upper surface 21 is an arc-shaped surface, is provided with the flow disturbing surface 5 and is further provided the wings 103, the path of the fluid passing through the shell body upper surface 21 is even longer than the path of the fluid passing through the shell body lower surface 22 which is a plane; when the speed per hour of the train is about 200-350 kilometers, and the shell body 1 in the natural state at the speed inevitably generates extremely-large lift force to be integrally suspended; the larger the difference between the path of the fluid passing through the upper portion of the shell body 1 and the path of the fluid passing through the lower portion of the shell body 1 is, the larger the generated lift force is, and accordingly more gravity is overcome and more energy is saved.

By reasonably designing the structures of the wings 103, the fluid passing path is lengthened to a greater extent, larger pressure differences are generated between the upper surfaces and the lower surfaces of the wings 103 due to the extremely-large flow speed differences, and thus the weight of the shell body 1 serving as the load space can be mostly or completely overcome, and the shell body 1 is suspended between the first fluid channel 43 and the second fluid channel 44.

Meanwhile, the connecting plates 102 is connected with the wheels to completely eliminate the lift force, so that the ground holding force of the train is increased, and accordingly the train is more stable and safer.

Furthermore, the two sides of the shell body 1 of the train body, the upper plate body 23, the upper surfaces of the wings 103 and other portions of the shell body 1 are covered with solar devices, and the solar devices are used for converting solar energy into electric energy and can be solar panels or solar films or other solar devices.

When the train travels at a high speed, the load space of the shell body 1 is suspended, the connecting plate 102 are connected with the wheels to eliminate lift force, the energy consumption of the train at this moment is extremely small, and commercialization of trains which are driven by various kinds of green energy and solar energy is immediately achieved.

Furthermore, even if the wings 103 are removed, a larger pressure difference can still be better generated between the shell body upper surface 21 and the planar shell body lower surface 22 due to the fact that the shell body upper surface 21 is provided with the flow disturbing surface 5, so that the shell body 1 can better generate lift force to be suspended between the upper plate body 23 and the lower plate body 24, and meanwhile the connecting plate 102 is connected with the wheels to eliminate the lift force.

A Sixth Embodiment

As is shown in FIG. 9, the embodiment provides a suspension train operating system, and noise can be generated due to the fact that the engine 17 is used as the power device of the train in the second embodiment; the noise can be effectively lowered by arranging the suspension train 202 in the second embodiment in a cover body 20.

The cover body 20 is in the shape of an ordinary non-vacuum channel, and the train is arranged in the cover body 20; the distance between the periphery of the shell body 1 of the train and the inner wall of the cover body 20 is short, and the high-speed train can travel in the cover body 20.

When the high-speed train travels in the cover body 20, under the effect of the strong suction of the engine 17, the fluid within the limited range between the periphery of the shell body 1 and the inner wall of the cover body 20 can be sucked into the outer fluid channel 12 at a high speed to the greatest extent quite easily through the first air ports 14, so that a relative vacuum state is formed between the shell body 1 of the train and the front portion, the rear portion, the left portion and the right portion around the inner wall of the cover body 20; after the train travels in the cover body 20 by a certain distance, the relative vacuum state is formed within the range between the periphery of the shell body 1 and the cover body 20 in the distance, and thus the train travels in the cover body 20 in the relative vacuum state all the time.

Meanwhile, on the basis that the pressure difference transferring ring is converted into the first propelling force and the second propelling force of the invention, the air resistance borne by the train is further obviously reduced, and the traveling speed and the energy utilization rate are increased, so that the shell body 1 accounting for over 90% of the total weight of the train is suspended, lift force is eliminated by the wheels 7, and accordingly the suspension train 202 can travel in the relative vacuum state in the cover body 20.

Furthermore, the cover body 20 is of an ordinary non-vacuum pipeline structure.

Furthermore, the high-speed train in the above embodiment travels in a non-vacuum pipeline.

Currently, vacuum cover body 20 traffic is the main future development direction of the high-speed trains in the world; however, it is quite difficult to form the vacuum state in the cover body 20 which is hundreds of kilometers long, even if the vacuum state can be formed, the energy consumption is huge, and thus implementation is quite difficult.

According to the present invention, in the strong suction state of the engine, the vacuum state can be formed within the range between the shell body 1 of the train and the cover body 20 quite easily; after the suspension train 202 travels in the cover body 20 by a certain distance in a certain moment, the relative vacuum state is formed in the distance, and thus the train travels in the cover body 20 in the relative vacuum state with extremely small resistance all the time. In this way, the speed per hour of the train can be over 1000 kilometers and even higher quite easily.

A Seventh Embodiment

The embodiment is different from the above embodiment in that as is shown in FIG. 9, the outer surface of the cover body 20 in the shape of the ordinary non-vacuum channel is covered with a solar device 201, and the solar device 201 can convert solar energy into electric energy and can be a device 201 which can convert solar energy into electric energy, such as a solar panel or a solar film.

A large-scale solar power generation station which is hundreds of kilometers long or thousands of kilometers long and of the unique structure of the outer surface of the cover body 20 is formed around the outer surface of the cover body 20 along a high-speed rail line, and electric energy converted from solar energy is supplied into the cover body 20 to drive the operating system of the train.

The train is arranged in the cover body 20, the distance between the shell body 1 of the train and the inner wall of the cover body 20 is short, and the high-speed train travels in the cover body 20; the high-speed suspension train 202 in embodiments 1-5 is driven by the solar energy in the cover body 20 to travel.

In this way, the solar device 201 covering the outer surface of the cover body 20 which is hundreds of kilometers long or thousands of kilometers long forms the solar power generation station of the unique structure of the outer surface of the cover body 20. Accordingly, the high-speed rail operating system which is driven by solar energy is formed in the cover body 20 in the shape of the ordinary non-vacuum pipeline.

The electric energy converted from solar energy by the solar device 201 covering the outer surface of the cover body 20 which is hundreds of kilometers long or thousands of kilometers long can sufficiently drive the high-speed suspension train 202 to travel in the high-speed rail operating system in the cover body 20; redundant electricity can serve as power output.

In this way, all energy is provided by solar energy, and the high-speed suspension train 202 driven by solar energy and the railway system driven by solar energy are created accordingly.

In conclusion, the suspension train 202 and the operating system thereof in the invention change the general common sense that all the weight generated by the self weight, the load and the gravitational acceleration of a high-speed train in the prior art is borne by wheels 7; the shell body 1 which serves as the whole carrying space and accounts for over 90% of the weight of the train can be made to generate lift force to be suspended when the train travels in the natural state, the wheels 7 are made to eliminate the lift force, the ground holding force of the wheels 7 is increased, and the train can travel more stably and safely.

The shell body 1 generates lift force to be suspended, the wheels 7 eliminate the lift force, and the two technical structures which seem mutually contradictory are combined harmonious in this way.

Furthermore, the cover body 20 of the invention is in the shape of the ordinary non-vacuum pipeline, the train is arranged in the non-vacuum channel of the cover body 20, and the suspension train 202 can travel in the relative vacuum state, so that the speed per hour of the suspension train 202 can be over 1000 kilometers or even higher quite easily.

Furthermore, all energy of the invention is provided by solar energy, and the high-speed suspension train 202 driven by solar energy and the railway system driven by solar energy are created accordingly.

Furthermore, on the premise that no extra power is increased, the larger the positive-negative pressure difference between the windward side and the leeward side of the front portion and the rear portion of the shell body 1 of the train is, the larger the second propelling force generated from back to front is; the second propelling force even can be not smaller than the original propelling force of the train through reasonable design. Furthermore, on the premise that no extra power is increased, the shell body structure of the suspension train 202 of the invention can generate the multifold pressure difference transferring ring in the traveling process of the train, the corresponding quantity of first propelling force sources can be obtained by transferring a certain quantity of fluid resistance outwards through the pressure difference transferring ring, and thus the actual energy utilization rate is increased to the corresponding extent.

Particularly, the discovery of the first propelling force source will bring an energy revolution and profoundly influence the future development of energy, power devices and high-speed trains.

The forgoing description is only the embodiments of the invention and does not limit the patent scope of the invention, and all equivalent transformation made according to the content of the description and the drawings of the invention or the behaviors of indirectly or directly applying the invention to relevant technical fields are within the patent protection scope of the invention.

What is claimed is:

1. A suspension train, comprising a shell body and wheels, wherein the suspension train further comprises a flow disturbing plate; the flow disturbing plate is connected with the wheels, a lower portion of the shell body is connected with the flow disturbing plate through connecting devices, so that a fluid channel communicating with the outside is formed between an upper surface of the flow disturbing plate and the lower portion of the shell body; the lower surface of the flow disturbing plate and/or the upper portion of the shell body is a flow disturbing surface for lengthening a fluid passing path, a path of the fluid passing over the upper portion of the shell body above the connecting devices is longer than a path of the fluid over the lower portion of the shell body so that lift force is generated by the shell body, and a path of the fluid passing over the lower surface of the flow disturbing plate below the connecting devices is longer than a path of the fluid passing over the upper surface of the flow disturbing plate to make the wheels eliminate the lift force.

2. The suspension train according to claim 1, wherein the shell body comprises an upper portion of the shell body and a lower portion of the shell body, and a flow disturbing surface used for lengthening the fluid passing path is arranged on the upper portion of the shell body; the fluid channel is formed between the upper surface of the flow disturbing plate and the lower portion of the shell body, so that the path of the fluid passing over the upper portion of the shell body is longer than the path of the fluid passing over the lower portion of the shell body, so that lift force is generated by the shell body.

3. The suspension train according to claim 1, wherein the path of the fluid passing over the flow disturbing surface of the lower surface of the flow disturbing plate is longer than the path of the fluid passing over the fluid channel over the upper surface of the flow disturbing plate to make the wheels eliminate the lift force.

4. The suspension train according to claim 1, wherein the suspension train further comprises a supporting plate, the supporting plate is fixedly arranged on the lower surface of the flow disturbing plate and connected with the wheels.

5. The suspension train according to claim 4, wherein the suspension train further comprises magnetic devices, the magnetic poles of the magnetic devices in two opposite directions are opposite so that repulsive force is generated, and the magnetic devices are arranged in the fluid channel.

6. The suspension train according to claim 1, wherein the flow disturbing surface comprises arcs, triangles and/or trapezoids for lengthening the fluid passing path; or the flow disturbing surface comprises a plurality of spiral flow disturbing strips, or the flow disturbing surface comprises water ripples which are symmetrical in the longitudinal direction or symmetrical in the transverse direction and the longitudinal direction.

7. The suspension train according to claim 1, wherein an inner fluid channel and an outer fluid channel which communicate with the outside are sequentially formed in part of the interior or the whole interior of the shell body of the train in a surrounding mode from inside to outside, and a flow disturbing surface which is concave and convex relative to the surface is arranged in the outer fluid channel.

8. The suspension train according to claim 7, wherein the suspension train comprises first air ports and second air ports which are formed in the shell body; the outer fluid channel communicates with the outside through two or more first air ports; the inner fluid channel communicates with the outside through communication pipes and two or more second air ports; the venting areas of the first air ports are larger than the venting areas of the second air ports.

9. The suspension train according to claim 7, wherein the inner fluid channel communicates with the outer fluid channel through two or more second air ports.

10. The suspension train according to claim 7, wherein the suspension train further comprises an engine, and an air suction port of the engine communicates with the first air ports through the outer fluid channel, the engine is located in a exhaust port at the rear of the shell body of the suspension train, and a fluid ejected by the engine drives the suspension train.

11. The suspension train according to claim 7, wherein the suspension device comprises control devices, and the control devices are arranged in the first air ports to control opening, closing and air input.

12. A suspension train, comprising a shell body and wheels, wherein the suspension train further comprises a connecting plate, and the connecting plate is formed by connecting an upper plate body and a lower plate body through two or more supporting frames; the shell body is arranged between the upper plate body and the lower plate body, fluid channels communicating with the outside are formed between the shell body and the upper portion of the shell body as well as between the shell body and the lower portion of the shell body correspondingly; the support frames are arranged outside or inside the shell body, and the support frames disposed inside the shell body freely penetrate through the shell body, and generation of lift force by the shell body is not affected when the connecting plate eliminates the lift force;

connecting devices are connected between the lower plate body and the lower portion of the shell body, and the lower plate body is connected to the wheels;

above the connecting devices, a flow disturbing surface is arranged on the upper portion of the shell body, and a pressure difference is generated between the flow disturbing surface and the lower portion of the shell body to make the shell body generate lift force;

a flow disturbing surface is arranged on a lower surface of the lower plate body below the connecting devices, so that a path of a fluid passing over the lower surface of a flow disturbing plate is longer than a path of a fluid passing over the upper surface of the flow disturbing plate, so that lift force is eliminated by the wheels.

13. The suspension train according to claim 12, wherein the supporting frames are hollow or solid structures, the supporting frames are linear or strip-shaped or arc-shaped structures; the supporting frames disposed inside the shell body freely penetrate through the interior of the shell body and are connected with the upper plate body and the lower plate body.

14. The suspension train according to claim 12, wherein the suspension device comprises connecting devices, and the shell body is arranged between the upper plate body and the lower plate body through the connecting devices.

15. The suspension train according to claim 12, wherein a first fluid channel and a second fluid channel are formed between the upper plate body and the lower plate body and the shell body; the first fluid channel is formed by the upper plate body and the upper portion of the shell body, and the second fluid channel is formed by the lower plate body and the lower portion of the shell body.

16. The suspension train according to claim 12, wherein the suspension train further comprises wings, the wings are arranged on the two sides or the upper portion of the shell body in a connected mode, and flow disturbing surfaces which are concave and convex relative to the surfaces are arranged on part of the upper surfaces or the whole upper surfaces of the wings; the wings are connected with a control mechanism of the train, and the control mechanism controls the angle change and shape change of the wings.

17. The suspension train according to claim 12, wherein the suspension train further comprises magnetic devices, the magnetic devices are locally or integrally arranged between the lower portion of the shell body and the lower plate body and generate repulsive force, and the magnetic devices generate magnetic fields with opposite magnetic properties in the direction facing the shell body and the direction facing the connecting plate correspondingly.

18. The suspension train according to claim 12, wherein the flow disturbing surface is composed of a plurality of arcs or a plurality of triangles or a plurality of trapezoids which are concave and convex relative to the surface, or the flow disturbing surface is composed of water ripples which are symmetrical in the longitudinal direction or symmetrical in the longitudinal direction and the transverse direction correspondingly.

19. A suspension train operating system, wherein the suspension train operating system comprises a non-vacuum cover body and the suspension train according to claim 1, and the suspension train travels in the non-vacuum cover body; the outer surface of the non-vacuum cover body is covered with a solar device.

20. The suspension train operating system according to claim 19, wherein the outer surface of the non-vacuum cover body is covered with a solar device to form a solar power generation station to power a high-speed rail system inside the cover body.

21. A suspension train operating system, wherein the suspension train operating system comprises a non-vacuum cover body and the suspension train according to claim 12, and the suspension train travels in the non-vacuum cover body; the outer surface of the non-vacuum cover body is covered with a solar device.

22. The suspension train operating system according to claim 21, wherein the solar device forms a solar power generation station to power a high-speed rail system inside the cover body.

* * * * *